United States Patent
Krummrich

(10) Patent No.: US 7,042,632 B2
(45) Date of Patent: May 9, 2006

(54) RAMAN AMPLIFIER

(75) Inventor: Peter Krummrich, München (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 10/398,016

(22) PCT Filed: Sep. 17, 2001

(86) PCT No.: PCT/DE01/03569

§ 371 (c)(1),
(2), (4) Date: Mar. 31, 2003

(87) PCT Pub. No.: WO02/27981

PCT Pub. Date: Apr. 4, 2002

(65) Prior Publication Data

US 2004/0100683 A1     May 27, 2004

(30) Foreign Application Priority Data

Sep. 29, 2000   (DE) ............................ 100 48 460

(51) Int. Cl.
*H04B 10/12* (2006.01)
(52) U.S. Cl. ........................................ 359/334
(58) Field of Classification Search .............. 359/334
See application file for complete search history.

(56) References Cited

U.S. PATENT DOCUMENTS

| | | | |
|---|---|---|---|
| 6,097,535 A | 8/2000 | Terahara | |
| 6,111,688 A * | 8/2000 | Kobayashi et al. | 359/337.13 |
| 6,115,174 A | 9/2000 | Stephens et al. | |
| 6,292,288 B1 * | 9/2001 | Akasaka et al. | 359/334 |
| 6,445,492 B1 * | 9/2002 | Nielsen et al. | 359/334 |
| 6,452,716 B1 * | 9/2002 | Park et al. | 359/334 |
| 6,587,259 B1 * | 7/2003 | Islam et al. | 359/334 |
| 6,611,370 B1 * | 8/2003 | Namiki et al. | 359/334 |
| 6,614,586 B1 * | 9/2003 | Hayee et al. | 359/334 |
| 6,624,926 B1 * | 9/2003 | Hayashi et al. | 359/334 |
| 6,747,788 B1 * | 6/2004 | Kinoshita | 359/334 |
| 6,798,945 B1 * | 9/2004 | Pasquale et al. | 385/24 |

FOREIGN PATENT DOCUMENTS

| DE | 199 10 041 | 8/2000 |
|---|---|---|
| EP | 0 139 081 | 5/1985 |

OTHER PUBLICATIONS

Massicott, "Low Noise Operation of ER3+ Doped Silica Fibre Amplifier Around 1.6 UM", pp. 1924-1925.

* cited by examiner

*Primary Examiner*—Jack Keith
*Assistant Examiner*—Eric Bolda
(74) *Attorney, Agent, or Firm*—Bell, Boyd & Lloyd LLC

(57) ABSTRACT

A Raman amplifier is provided which includes a number of pump lasers whose pump wavelengths and output powers are particularly selected such that the associated optical signal-to-noise ratio curve is optimized.

9 Claims, 2 Drawing Sheets

RAMAN AMPLIFIER

BACKGROUND OF THE INVENTION

It is known that an optical signal is attenuated during transmission through an optical fiber. The optical signals, therefore, have to be amplified. Two physical criteria are critical for the optical transmission of signals: firstly the gain and secondly the optical signal-to-noise ratio (OSNR). In the case of WDM (wavelength division multiplex) systems, these two criteria must be adequate and constant for all WDM signals over a wide range of frequencies. Ideally, the signal level and signal-to-noise ratio curves will be flat. The use of distributed Raman amplification in the transmission fiber allows the characteristics of optical transmission systems to be considerably improved. All the WDM channels (discrete signals) at the end of the fiber must exhibit at least approximately equal amplitudes. If the gain spectra were not flat, the dynamic range of the receiver would be exceeded or not completely utilized.

The purpose of optimization is normally to provide a maximally flat gain spectrum or maximally equal output levels of the individual channels at the end of the transmission fiber section. A very flat gain spectrum over a wide wavelength range can only be achieved by using a large number of pump wavelengths. To date, known distributed Raman amplifiers for WDM transmission systems employ, for example, several pump lasers whose output signals each exhibit a different wavelength.

"Low noise operation of $Er^{3+}$ doped silica fibre amplifier around 1.6 µm", J. F. Massicott, R. Wyatt, B. J. Ainslie, Electronics Letters, Vol. 28, No. 20, $24^{th}$ Sep. 1992 describes an amplifier for a signal bandwidth of 40 nm between 1.57 and 1.61 µm. Here pump signals from two pump lasers are injected into the fiber. The wavelength of the signal to be transmitted is 1.6 µm and the wavelength of the first pump laser is 1.48 µm. The larger 1.55 µm wavelength and the output power of the second pump laser are selected such that the WDM channels distributed over a bandwidth of 40 nm are amplified as uniformly as possible at 35% population inversion of the amplifier at the WDM signal input. In the reference quoted, different pump source output powers are tested to optimize gain and OSNR. As shown in FIG. 2 of this reference, the gain and noise power curves are optimized over a bandwidth of approximately 40 nm for a selected pump power of 87 mW at 1.55 µm and an additional pump power of −17 dBm at 1.48 µm. The noise power variations are approximately 1 dB for a gain of 24 dB. Higher gains up to 31 dB can be achieved if larger gain differences between the WDM channels of approximately 10 dB are permitted.

Patent application EP 0139081 A2A describes a Raman amplifier having a number of Raman amplifier stages (RA1, RA2 . . . ) each having a number of pump sources whose wavelengths are close together. This makes the maximum of the Raman gain spectrum flatter, and the WDM channels at the amplifier output exhibit similar levels (page 13, lines 9–11).

EP 1 018 666 A1 discloses a Raman amplifier having a number of pump sources whose signals have different wavelengths with intervals of 6 to 35 nm between them to even out the level curve of a WDM signal, so that it is not necessary to filter the levels using a "gain flattening filter".

DE 199 10 041 A1 discloses an optical amplifier wherein a compensation pump signal is fed into a dispersion-compensating fiber, the amplitude and frequency of the signal being selected such that a required adjustment of the levels of the wideband signal to be amplified is achieved.

U.S. Pat. No. 6,115,174 discloses an optical transmission system having a pump source whose pump signals have different wavelengths. The wavelengths and the power of the pump signals are selected and varied such that a change in the level response of an amplified wideband signal can be set and varied respectively.

U.S. Pat. No. 6,097,535 describes a method and an arrangement for optical amplification of a WDM signal having a number of channels for which wavelength-dependent variations in the levels and signal-to-noise ratios are minimized. To flatten the signal-to-noise ratio spectrum, a first optical filter is disposed between two cascaded amplifiers. To flatten the level spectrum, a second optical filter is connected at the output of the amplifiers. Using two optical filters is costly here.

An object of the present invention is, therefore, to specify an amplifier with optimum signal-to-noise ratio curves. In addition, the gain must be as equal as possible for all the WDM channels.

SUMMARY OF THE INVENTION

A Raman amplifier is specified having a number of pump lasers whose pump wavelengths and output powers are selected such that the OSNR curve is optimized.

If the frequency of a WDM channel is Stokes-shifted (maximum gain at 13.2 THz shift) with respect to the frequency of a pump source, that channel is optimally amplified (see "Fiber-Optic Communication Systems", $2^{nd}$ Edition, Govind P. Agrawal, page 381, FIG. 8.11). As in practice the number M of pump sources is less than the number of WDM channels for cost reasons, the channels are differentially amplified. As such, the level and signal-to-noise ratio curves are initially not ideal over the bandwidth of the WDM signal. The signal-to-noise ratio can be optimized for the entire WDM signal bandwidth by suitably selecting the wavelengths and output powers of a small number of pump sources.

For the distributed Raman amplifier according to the present invention, the distribution of the pump radiation components for the individual pump wavelengths is selected so as to achieve not equal levels but equal signal-to-noise ratios of the individual channels at the output of the transmission fiber section.

Using this technique increases the minimum signal-to-noise ratio at the end of the route or the length of the route to be spanned. The gain spectrum of the Raman amplifier must additionally exhibit a flat response so that the dynamic range of the receiver is not limited or even exceeded. However, the critical factors for improving the system characteristics are the signal-to-noise ratio and the minimum channel level occurring in the relevant transmission fiber section. To ensure that all the channels benefit to an equal degree from distributed Raman amplification, the noise figures or the minimum levels of all the channels must coincide as closely as possible at a point on the transmission fiber where Raman amplification is employed. Otherwise the achievable system optimization will be limited by the channel having the lowest level or the worst noise characteristics. The gain spectral response or the level distribution of the channels at the output of the transmission section can be equalized via a filter.

Consequently, the channels at the filter output exhibit both equal signal quality and equal levels, assuming that the signals at the input of the transmission fiber likewise exhibit equal levels and equal signal-to-noise ratios.

Ideally, the transmission system's repeaters, typically consisting of erbium-doped fiber amplifiers (EDFAs), have a flat gain spectrum. If, on the other hand, the EDFAs exhibit a flat gain spectrum but not a flat signal-to-noise ratio spectrum, the distribution of the signal-to-noise ratios of the channels at the output of the distributed Raman amplifier also can be optimized for this scenario. For this purpose, the Raman amplifier's pump signal power distribution must be adjusted so that channels at the output of the Raman amplifier exhibit equal signal-to-noise ratios. Channels with higher signal-to-noise ratios which are not impaired by the fiber amplifiers can be disregarded for Raman amplification, and channels with low signal-to-noise ratio or channels for which the EDFA exhibits a low signal-to-noise ratio must be taken particularly into account for Raman amplification. As the EDFA has a flat gain spectrum, the levels of the channels will be different at the expense of their now equal signal-to-noise ratios. However, the channel levels must not deviate substantially from one another at the output of the Raman amplifier. This again can be achieved using a filter specially optimized for this scenario.

Additional features and advantages of the present invention are described in, and will be apparent from, the following Detailed Description of the Invention and the Figures.

DETAILED DESCRIPTION OF THE INVENTION

Figure 1:
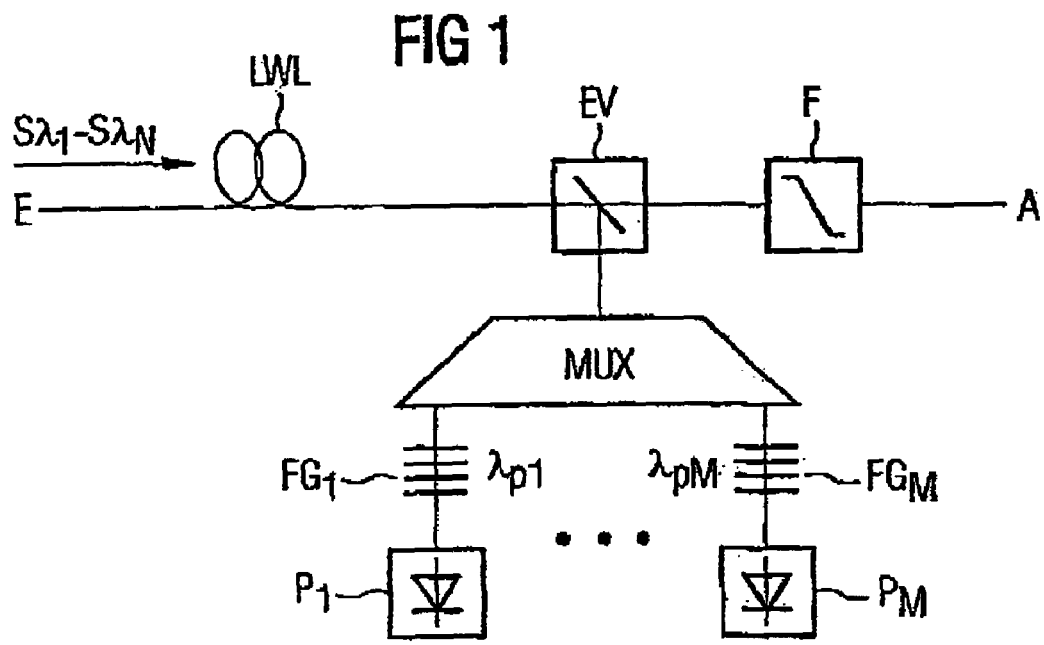
FIG. 1 shows an amplifier according to the present invention.

FIG. 1 illustrates an arrangement of the new amplifier. A WDM signal is fed to an optical fiber at the input E of the distributed Raman amplifier. It is assumed that the WDM signal contains N channels with corresponding wavelengths $\lambda_1$ to $\lambda_N$. The output signals of M pump sources (lasers) $P_1$ to $P_M$ are injected into the transmission fiber LWL contra-directionally to the propagation direction of the WDM signal via a wavelength multiplexer MUX and a launching device EV. The wavelengths $\lambda_{P1}$ to $\lambda_{PM}$ of the output signals are stabilized using the fiber lattices $FG_1$ to $FG_M$. The output A of the new Raman amplifier is preceded by a filter F which adjusts the levels of all the channels so that the level curve of the channels is flat at the output A.

Figure 2:
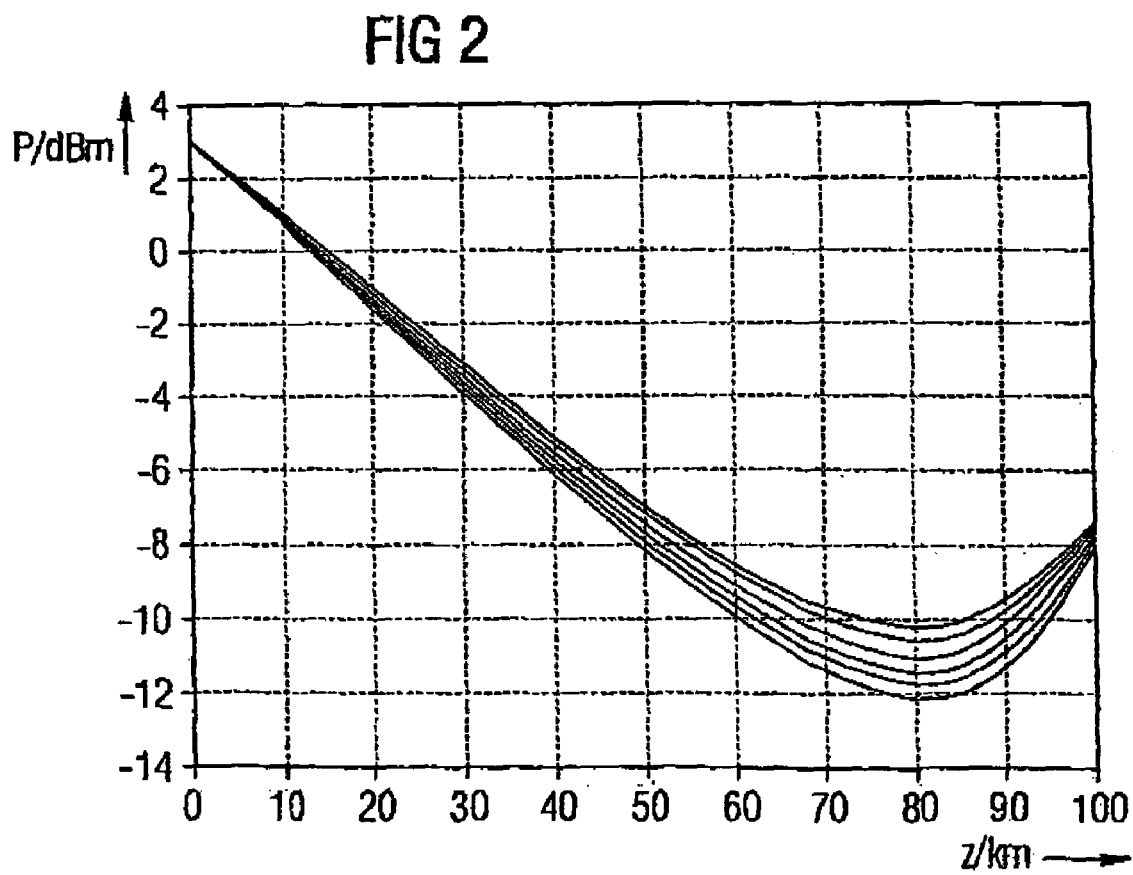
FIG. 2 shows level curves of the channels along the transmission fiber when they are distributed for pump laser powers such that a flat level spectrum is achieved at the end of the fiber.

FIG. 2 shows the level curves of the individual channels along the transmission fiber for a Raman amplifier designed to achieve equal output levels. The wavelengths of the six pump laser diodes are stabilized to the following center wavelengths using the fiber lattices $FG_1$ to $FG_6$ in the output fiber: 1409 nm, 1424 nm, 1453 nm, 1467 nm, 1482 nm. For the example, the output powers of the individual pump lasers have been set such that all the channels exhibit approximately equal levels from the output of the fiber, even with Raman amplification. This can be achieved, for example, using the pump powers 23 dBm, 23 dBm, 19 dBm, 18 dBm, 18 dBm and 18 dBm, respectively. 40 channels in the wavelength range 1530.33 to 1561.42 nm with 100 GHz channel spacing and a level of +3 dBm per channel are injected at the fiber input. The transmission fiber section is 100 km long and has an attenuation constant of 0.22 dB/km, corresponding to an overall loss of 22 dB. With the Raman pump lasers switched off, the channels arrive at the far end of the fiber with output levels of −19 dBm per channel. Noticeable in FIG. 2 are the markedly different minimum levels of the channels caused by differential attenuation in the transmission fiber.

Figure 3:
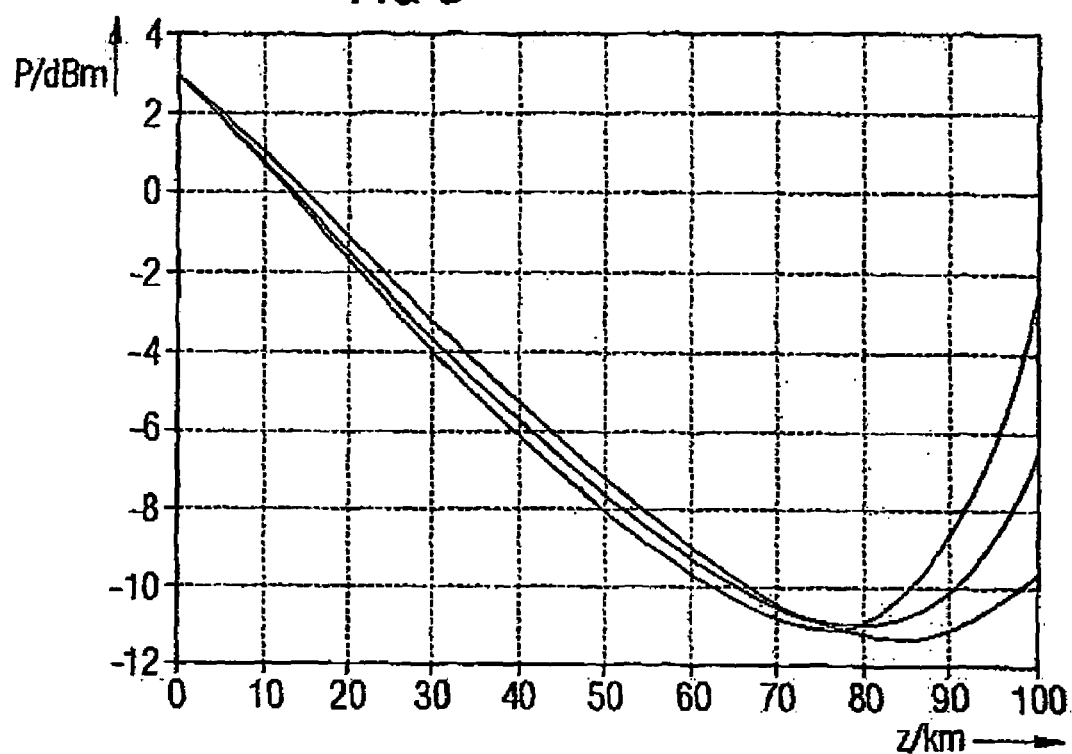
FIG. 3 shows level curves of the channels along the transmission fiber with a pump laser power distribution for achieving a flat signal-to-noise ratio spectrum at the end of the fiber.

FIG. 3 shows level curves of the channels along the fiber for an amplifier dimensioned according to the present invention. The output powers of the 6 pump lasers are now selected at 0 dBm, 26 dBm, 22 dBm, 18 dBm, 16 dBm, 10 dBm, the sum of the pump powers remaining constant at 28.3 dBm. Compared to FIG. 1, the minimum levels of the channels in the fiber vary much less, but the levels at the end of the transmission fiber vary more markedly than in FIG. 2.

Figure 4:
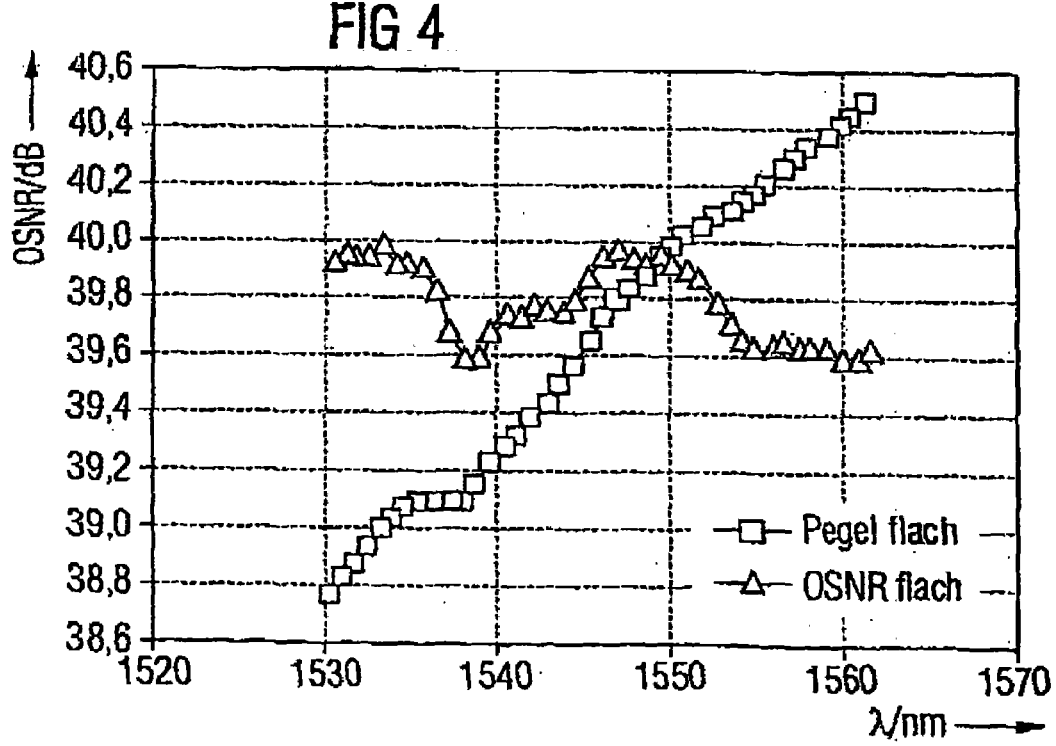
FIG. 4 shows a comparison of the signal-to-noise ratios of the channels at the output of the Raman amplifier for a flat gain spectrum and optimized signal-to-noise ratio.

FIG. 4 allows the optical signal-to-noise ratios at the output of the known Raman amplifier and of the Raman amplifier according to the present invention to be compared. For the amplifier according to the prior art with flat level spectrum, the OSNR curve rises perceptibly toward longer wavelengths. The amplifier according to the present invention, on the other hand, achieves a flatter OSNR response of the channels. The smallest OSNR value of the amplifier according to the present invention is 39.6 dB, whereas some channels of the known amplifier exhibit much lower OSNR values down to 38.8 dB. The amplifier according to the present invention, therefore, achieves a much better system response with the same total pump output power. The small variations in the OSNR curve of the amplifier according to the present invention can be reduced even more by further optimization of the output wavelengths of the pump lasers or by using additional pump lasers.

Although the present invention has been described with reference to specific embodiments, those of skill in the art will recognize that changes may be made thereto without departing from the spirit and scope of the present invention as set forth in the hereafter appended claims.

The invention claimed is:

1. A Raman amplifier, comprising:
   a plurality of pump sources; and
   means for assigning each pump source to a wavelength for establishing a WDM signal containing a plurality of optical channels with different wavelengths transmitted via an optical fiber, wherein the wavelengths and output powers of the pump sources are selected such that all the optical channels of the WDM signal exhibit substantially equal optical signal-to-noise ratios at an end of the optical fiber.

2. A Raman amplifier as claimed in claim 1, wherein a pump signal launching device is disposed at the end of the optical fiber via which the pump signals are injected into the optical fiber contradirectionally to the WDM signal.

3. A Raman amplifier as claimed in claim 1, further comprising a wavelength multiplexer for combining the pump signals from prior to injection into the optical fiber.

4. A Raman amplifier as claimed in claim 1, wherein laser diodes are provided as the pump sources.

5. A Raman amplifier as claimed in claim 1, further comprising fiber lattices connected at an output of each pump source as optical filters so that the pump signals exhibit narrow stabilized wavelength ranges.

6. A Raman amplifier as claimed in claim 1, wherein the output powers of the pump sources can be individually adjusted for amplifying all the channels of the WDM signal.

7. A Raman amplifier as claimed in claim 1, further comprising a filter for achieving a flat level response of the amplified WDM signal at an output of the Raman amplifier.

8. A Raman amplifier as claimed in claim 1, wherein the amplifier exhibits a variation of less than 0.5 dB in an optical signal-to-noise ratio gain spectrum for a WDM bandwidth of 80 nm in an 1.5 µm wavelength window after a transmission route of 100 km.

9. A Raman amplifier as claimed in claim 1, wherein the pump signals are provided with wavelengths of 1409 nm, 1424 nm, 1438 nm, 1453 nm, 1467 nm, 1482 nm and distributed output powers of 0 dBm, 26 dBm, 22 dBm, 18 dBm, 16 dBm and 10 dBm, respectively.

* * * * *